United States Patent
Valdes Vidal et al.

(10) Patent No.: US 12,552,917 B2
(45) Date of Patent: Feb. 17, 2026

(54) GRANULATED ADDITIVE BASED ON TEXTILE FIBRES FROM END-OF-LIFE TYRES (ELT), TYRE POWDER AND ASPHALT BINDER AND METHOD FOR OBTAINING THE PRODUCT AND USE

(71) Applicant: UNIVERSIDAD DE LA FRONTERA, Temuco (CL)

(72) Inventors: Gonzalo Alfonso Valdes Vidal, Temuco (CL); Luis Alejandro Mardones Parra, Temuco (CL); Alejandra Tatiana Calabi Flood, Temuco (CL)

(73) Assignee: UNIVERSIDAD DE LA FRONTERA, Temuco (CL)

( * ) Notice: Subject to any disclaimer, the term of this patent is extended or adjusted under 35 U.S.C. 154(b) by 874 days.

(21) Appl. No.: 17/631,732

(22) PCT Filed: Jul. 30, 2020

(86) PCT No.: PCT/IB2020/057233
§ 371 (c)(1),
(2) Date: Jan. 31, 2022

(87) PCT Pub. No.: WO2021/019501
PCT Pub. Date: Feb. 4, 2021

(65) Prior Publication Data
US 2022/0275177 A1    Sep. 1, 2022

(30) Foreign Application Priority Data
Aug. 1, 2019 (CL) .................................. 2171-2019

(51) Int. Cl.
*C08L 9/00*    (2006.01)
(52) U.S. Cl.
CPC ..................... *C08L 9/00* (2013.01)

(58) Field of Classification Search
CPC ....................................................... C08L 9/00
See application file for complete search history.

(56) References Cited

U.S. PATENT DOCUMENTS

| 5,367,007 A | 11/1994 | Richards |
| 5,811,477 A * | 9/1998 | Burris ............... C08L 95/00 524/68 |

(Continued)

FOREIGN PATENT DOCUMENTS

| CN | 103289420 A | 9/2013 |
| ES | 2355436 T3 | 3/2011 |

(Continued)

OTHER PUBLICATIONS

J. Schilling, et al; Modificacion con caucho reciclado de neumatico de un ligante Ca-24 y caracterizacion mediante ensayos de desempeno; Universidad Tecnica Federico Santa Maria; Jul. 2018; 82 pages.

(Continued)

*Primary Examiner* — Catherine S Branch
*Assistant Examiner* — Andrea Wu
(74) *Attorney, Agent, or Firm* — LUCAS & MERCANTI, LLP

(57) ABSTRACT

A solution to the two major problems that exist today, on the one hand, by recovering the textile fibers extracted from the recycling and Processing of ELTs and, on the other hand, by providing the asphalt paving industry with an alternative mixture with superior performance to that of existing conventional mixtures. More specifically, a granulated additive based on textile fibers and rubber powder from end-of-life tires, having (a) 20% to 30% of textile fiber composed mainly of polyamide or polyester fibers, which together are of the order of 10% by weight of an ELT, (b) 20% to 50% of asphalt binder, (c) 25% to 45% of rubber powder from end-of-life tires in a fraction smaller than 0.5 mm, and (d) 3% to 10% of rubber powder from end-of-life tires in a (Continued)

fraction smaller than 0.18 mm. In addition, the method for obtaining same and its use in asphalt mixtures.

7 Claims, 1 Drawing Sheet

(56) References Cited

U.S. PATENT DOCUMENTS

| | | | |
|---|---|---|---|
| 9,156,984 B2 * | 10/2015 | De Amorim Novais Da Costa Nóbrega | C08L 95/00 |
| 2019/0040258 A1 * | 2/2019 | Coe | E01C 7/265 |

FOREIGN PATENT DOCUMENTS

| | | | | |
|---|---|---|---|---|
| WO | 2004089610 | A2 | 10/2004 | |
| WO | 2007011249 | A1 | 1/2007 | |
| WO | 2010079062 | A2 | 7/2010 | |
| WO | WO-2014044856 | A1 * | 3/2014 | B29B 7/38 |

OTHER PUBLICATIONS

E. Gonzalez; Estudio experimental sobre el reemplazo de ligante asfaltico por redes de nylon mediante su analisis elastico y dinamico bajo el ensayo de modulo resiliente y deformacion asfaltica; Universidad Austral de Chile; 2018; 10 pages.

B.J. Putman, et al; Utilization of waste fibers in stone matrix asphalt mixtures; Resources, Conservation and Recycling: vol. 42; 2004; pp. 265-274.

A. Chowdhury, et al; Fibers from recycled tire as reinforcement in hot mix asphalt; Texas Transportation Institute; Apr. 2006; 58 pages.

D. Landi, et al; Investigating the feasibility of a reuse scenario for textile fibres recovered from end of life tyres; Waste Management; vol. 75; 2018; pp. 187-2014.

International Search Report for Corresponding International Application No. PCT/IB2020/057233 dated Oct. 8, 2020 and English Translation.

* cited by examiner

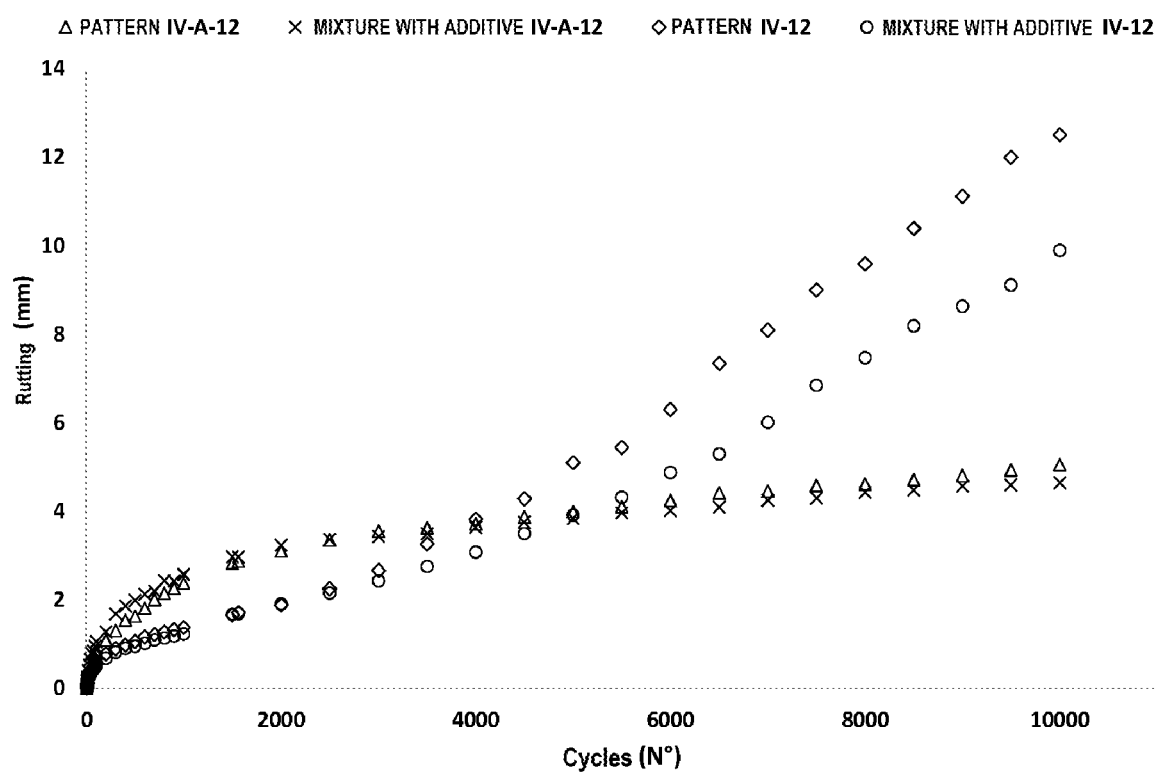

GRANULATED ADDITIVE BASED ON TEXTILE FIBRES FROM END-OF-LIFE TYRES (ELT), TYRE POWDER AND ASPHALT BINDER AND METHOD FOR OBTAINING THE PRODUCT AND USE

CROSS REFERENCE TO RELATED APPLICATION

This Application is a 371 of PCT/IB2020/057233 filed on Jul. 30, 2020, which claimed priority of Chilean Patent Application 2171-2019, filed Aug. 1, 2019, each of which are incorporated herein by reference.

FIELD OF THE INVENTION

The present invention discloses a granulated additive based on textile fibers and rubber powder from End-of-Life Tires (ELT), and asphalt binder and a method for obtaining the product and use. Through the present invention, a solution is given to the two great problems that exist today, on the one hand, valuing the textile fibers extracted from the recycling and processing of ELT, and, on the other hand, providing the asphalt paving industry, a blend alternative with superior performance to current conventional blends.

STATE OF THE ART

Regulatory procedures worldwide seek to reduce the generation of waste and promote its reuse, recycling, and valuation through different waste management instruments. In this context, ELT, being a non-biodegradable waste, are of real importance since they are becoming a major environmental problem (Delarze, 2008). Tires are essentially made of steel, rubber and textile fiber, and the ELT treatment process is mainly aimed at recovering steel and rubber. This is since there is no clearly defined market for textile fiber, which does not justify the resources for its cleaning. This lack of market has meant that different procedures are adopted, for example dirty fibers have been incinerated for energy recovery or have been sent to dumps and to a lesser extent have been reused in plastic compounds (Landi et al., 2016; Marconi et al., 2018).

The literature shows that there are different types of fibers which improve the mechanical properties of the mixtures. Abtahi et al. (2010) after a review of the use of different types of fibers (polypropylene, polyester, asbestos, cellulose, carbon, glass, and nylon) mentioned that these can increase the stiffness of the mixtures (Wu, Ye, Li, & Yue, 2007), decrease susceptibility to water, show better behavior against permanent deformations and have the ability to increase resistance to thermal cracking (Abtahi et al., 2010). The use of fiberglass has also been tested, which provides a better capacity against shear stress (Yoo & Kim, 2015). Ahmad & Kareem (2015) studied the incorporation of polypropylene fibers and concluded that these can improve the fatigue life of the mixtures, modulus, and susceptibility to water (Ahmad & Kareem, 2015; Zachariah, Sarkar, Debnath, & Pal, 2018).

The main components of the ELT textile fiber are polyamide and polyester (Acevedo et al., 2015). These components have been used individually as addition material in mixtures, proving to be beneficial in improving resistance to rutting fatigue, dynamic modulus, among other properties of asphalt mixtures (Badeli, Cárter, Doré, & Saliani, 2018; Kim, Kim, Yoo, & Shin, 2018; Wu, Ye, & Li, 2008). Consequently, it is possible to foresee that the addition of ELT textile fibers could provide improvements in the properties of the asphalt mixtures.

Regarding the use of ELT textile fibers in asphalt materials, the study by Hrusková et al. (2016) stands out, which mentions that after adding different additives within which the ELT textile fibers were found, a decrease of binder penetration was observed. Also, the study of Putman and Amirkhanian, 2004, stands out, who after using three types of SMA mixtures characterized by having cellulose fibers, ELT textile fibers and polyester fibers, proved that the incorporation of ELT textile fibers show a better toughness in the mixture, however, no significant improvements were observed regarding resistance to permanent deformation and susceptibility to water (Putman & Amirkhanian, 2004). It is worth mentioning that the fibers were added in loose form and not in granulated form. However, Chowdhury et al., 2006, by adding long and short ELT textile fibers, proved that there is an improvement in permanent deformation properties compared to a reference mixture and a mixture with the addition of cellulose fibers (Chowdhury et al., 2006). For its part, Chowdhury et al., (2006) concludes that the use of ELT textile fibers in percentages greater than 1% relative to the binder, can generate asphalt absorption, which can bring negative consequences if it is not evaluated in the design phase (Chowdhury et al., 2006).

In the same context, comparisons have been made between the different reuse applications of ELT textile fibers in terms of environmental benefits and reduction of waste disposal, (Landi et al., 2016), observing that there is a great potential for revaluation of these fibers in asphalt pavements. Also, life cycle analysis has been carried out, which show that the use of ELT textile fibers in asphalt mixtures leads to the reduction of impacts against global warming, since it is estimated a considerable decrease in the emission of greenhouse gases and environmental pollution. (Landi, Gigli, Germani, & Marconi, 2018; Landi, Marconi, Meo, & Germani, 2018; Landi et al., 2016).

Regarding the field of this type of technology, it can be mentioned as an example that the length of the road network in Chile is approximately 82000 km, highlighting a high paving deficit, which is around 75%. On the other hand, of the paved road network, 88% corresponds to asphalt pavements (Burgos, 2014). Worldwide, this figure rises to 95% (Anderson, Youtcheff, & Zupanick, 2000), due to its good performance and low construction costs. In recent years, these figures have grown due to the use of different types of additives which create more resistant and durable pavement structures.

As can be seen, the literature is able to demonstrate that the use of ELT textile fibers in asphalt mixtures is beneficial and economically attractive, however, a more detailed evaluation has not been carried out in this regard, especially in granulated form suitable for use in the industry.

Due to the problems generated by environmental pollution and the use of additives of natural origin (e.g.: cellulose fibers), there are different research centers that seek to provide alternative solutions to these problems, which is why they have seen the need to use materials as waste, revaluing them and incorporating them into materials. A clear example of this is the use of rubber or RAP. On the other hand, the literature shows that there is very little research on the use of other residues such as the textile fibers of the ELT, since despite being a residue that allows improving the structural capacity of pavements, it is not studied in depth due to the complexity of its addition in mixtures and there is no evidence on an industrial scale.

For this reason, the product disclosed in this patent application turns out to be interesting, since the additional procedures incorporated in its manufacture allow its workability and, therefore, more knowledge can be developed when used in asphalt mixtures. The incorporation of this additive in asphalt mixtures, together with improving its mechanical properties, allows the development of an alternative to take care of such a harmful waste for the environment, giving added value to its use.

From the documents analyzed, there is no document in the state of the art that discloses, under the same conditions and with the percentages indicated, a "Granulated additive based on textile fibers from End-of-Life Tires (ELT), rubber or tire powder and Asphalt binder". Finally, although there is a lot of literature on the reuse of textile fibers recovered from end-of-life tires (ELT), they are all investigations in the technical area, but they do not teach a granulated additive containing 20-30% synthetic fiber, 43% rubber and 20-40% asphalt binder as the present invention patent application does.

DESCRIPTION OF THE FIGURE

FIG. 1: In FIG. 1 the results of the mixtures evaluated may be observed in the test procedure "Hamburg Wheel Tracking".

DEFINITION OF THE INVENTION

The present invention discloses a granulated additive based on textile fibers and rubber powder from End-of-Life tires (ELT), and asphalt binder.

The granulated additive of the present invention is used in the manufacture of asphalt mixtures, with the ability to improve and/or not affect the mechanical properties and/or performance of this construction material used in flexible pavements. Also, due to the high absorption and retention capacity of this additive, added to the possibility of reducing the use of virgin raw materials, it can be used to replace cellulose fibers in SAM (Stone Mastic Asphalt) mixtures.

The granular additive of the present invention comprises the following components in the concentrations indicated below:
- a.—Textile fiber between 20 to 30%, composed mainly of polyamide or polyester fibers, which together are around 10% by weight of a ELT.
- b.—Asphalt binder between 20 to 50%.
- c.—Rubber powder from end-of-life Tires (ELT) between 25 to 45% in a fraction less than 0.5 mm.
- d.—Rubber powder from end-of-life Tires (ELT) between 3 to 10% in a fraction less than 0.18 mm.

In addition, the process to obtain the granulated additive and its use is disclosed.

The process to obtain the granulated additive of the present invention comprises the following steps:

As a first step, the synthetic fibers from ELT are stored in their natural state after the tire recycling procedure. These are mainly made up of synthetic fibers and rubber particles with a size between approximately 0.05 mm and 2 mm.

Synthetic fibers in their natural state undergo a pre-dispersion procedure to increase their volume and thus facilitate the absorption of water and asphalt emulsion in the mixing procedure.

Once the synthetic fibers have been obtained, proceed as follows:
i. In an environment controlled by temperature between 10° C. and 30° C., add to the synthetic fibers in their natural state an asphalt emulsion diluted in water, which is in a temperature range between 5° C. and 70° C.;
ii. constantly mix the synthetic fiber with diluted emulsion, step (i), with one of the procedures indicated below:
 a. Manual procedure: Homogenize the synthetic fiber with diluted emulsion with a spoon and/or spatula, at a constant speed between 10 and 200 rpm with intervals of rest,
 b. Mechanical process: Homogenize the synthetic fiber with diluted emulsion in a mechanical mixer, whose mixing speed is in the range of 10 to 200 rpm. Try not to tear the fibers when using a mechanical procedure;
iii. once step (ii) is completed, squeeze the emulsion-saturated fibers with one of the following procedures:
 a. Manual procedure: spread the fibers saturated with emulsion in a container of variable size, depending on the amount of product to be manufactured, and knead or compress until the emulsion runs off;
 b. Mechanical procedure: deposit the product obtained in step (ii) in a container and compress with a hydraulic press, mechanical roller or equipment with similar characteristics, until the emulsion runs off;
iv. step (ii) and (iii) are repeated until the fiber is coated with emulsion;
v. dry the product obtained in step (iv) through one of the procedures indicated below:
 a. Manual procedure: Spread the product obtained in step (iii) in a clean container of variable size, depending on the amount of product to be manufactured, ensuring that its thickness once spread is less than 40 mm, and has an initial density between 0.05 gr/cm$^3$ and 0.20 gr/cm$^3$. Consider an ambient temperature between 10° C. and 40° C. for a period of 2 to 10 days until constant mass is obtained.
 b. Mechanical procedure: deposit the product obtained in step (iii) in a storage chamber. This chamber must be connected to a mechanical air injection process with temperature regulation. A continuous air flow must be applied to the product, at a temperature between 10° C. and 70° C. until constant mass is achieved. The mixture, in its initial state, must have a density between 0.5 gr/cm$^3$ and 1 gr/cm$^3$. The product must be contained in a mesh inside the chamber, allowing better air distribution and avoiding contact between the chamber and the fiber with emulsion;
vi. extrude and/or knead the asphalt-coated fibrous dry product resulting from step (v), in order to densify it and give it a predetermined shape, thus obtaining the granulated additive in the shape of a cylinder, squares, rhombuses or any other geometric form;
vii. cutting predetermined shapes, for example cylinders made of fibrous material with rubber and asphalt powder, being sized, obtaining the additive in the form of granules;
viii. mix the fibrous granules with rubber powder in a proportion by weight between 3 to 10% and with a particle size of less than 0.18 mm, to avoid adherence between the granules, obtaining the fibrous granules wrapped in granulated rubber or additive;
ix. storing the granulated additive from step (viii) for later use.

This procedure is carried out constantly, until a complete distribution of the synthetic fibers with asphalt particles is achieved.

The drying step (v) is carried out to break the asphalt emulsion and the subsequent evaporation of the water contained in the mixture. In this way, a fibrous material is obtained which is covered with asphalt material.

IMPLEMENTATION EXAMPLES

In order to clarify the invention, the following examples of Implementation are attached, An additive was prepared according to the data indicated in the following table.

TABLE 1

Composition by weight of Granulated additive

| Compound | % by weight granulated |
|---|---|
| Synthetic fiber | 21 |
| Additional rubber powder (less than 0.18 mm)* | 4.8 |
| Rubber powder (less than 0.5 mm) | 38.2 |
| Asphalt binder** | 36 |
| Total | 100 |

*Addition rubber powder to avoid adhesion between granules in storage.
**Residual asphalt cement of the emulsion.

Asphalt and water emulsion was incorporated into the ELT textile fiber. This process was carried out manually with a mixing speed of 50 rpm for 2 minutes and at a room temperature of 20° C. Subsequently, to break the emulsion and evaporate the water, the mixture was subjected to a continuous air flow, at a temperature between 40° C., until the product had a constant mass (24 hours). Then, the resulting mixture was subjected to a manual kneading (extrusion) process until obtaining a granulated additive with a density of 2560 kg/m$^3$ (geometric density). Afterwards, this additive was cut until obtaining a cylindrical granule with a diameter of 0.25 mm and a height of 5 mm. Finally, a rubber powder fraction from ELT of less than 0.18 mm was incorporated, in a weight ratio of 1:20 relative to the granulated additive.

Example 1

To evaluate the behavior of the granulated additive, two mixtures commonly used as wearing course (top layer of a pavement structure) were designed. The first mixture was an IV-A-12, characterized by using a semi-dense granulometry and by having a very resistant mineral skeleton. The second mixture used was an IV-12, which was characterized by having a dense granulometry, where the presence of fine aggregate predominated in the mineral structure. For both mixtures, a conventional CA-24 binder was used, and the aggregates used were of fluvial origin. On the other hand, the optimal content of asphalt binder was 5.5% in relation to the weight of the mixture and 3.0% of the granulated additive was used in relation to the weight of the binder. It should be noted that the binder contained in the additive was deducted from the added binder.

On the other hand, the Hamburg Wheel Tracking test method was used as an implementation example. This is characterized by being one of the most abrasive methods for asphalt mixtures, since it seeks to measure the degree of deformation, moisture damage and deterioration to which a mixture is exposed after being subjected to a series of cyclical loads and the action of water at a temperature of 50° C. The results obtained express the degree of rutting presented by the mixtures and the presence of stripping in them (AASHTO T324-14).

The specimens used in this test are 150 [mm] in diameter, manufactured by rotatory compactor, with the application of approximately 100 turns. The test methodology establishes a conditioning period of 30 minutes at 50° C., after which a moving load of 705±4.5 [N] is applied for a duration of 10,000 cycles.

In FIG. 1, the results of the mixtures evaluated under the "Hamburg Wheel Tracking" test procedure can be observed. The mixtures with the addition of the granular additive present better rutting behavior for both types of mixtures, because the additive provides greater resistance. When using a mixture with a good mineral structure, such as an IV-A-12 mixture, the addition of the additive reduces rutting to a low degree, however, when using a more deformable mixture, characterized by having a higher content of fine aggregates, such as mixture IV-12, it is possible to observe an improvement of around 20% in the permanent deformations of the mixture at high temperatures. These tests allow demonstrating that the incorporation of the granulated additive of the present invention provides positive properties to the asphalt mixtures, highlighting a more significant improvement, after its use in mixtures with a lower mineral skeleton.

Implementation Example 2

Along with the improvement of mechanical properties, the granulated additive can also be used in mixtures with high binder content. To evaluate this absorption capacity, an SMA mixture was designed, characterized by having a discontinuous granulometry. For this mixture, a conventional CA-24 binder was used together with aggregates of fluvial origin. On the other hand, the optimal content of asphalt binder used was 6.5% in relation to the weight of the mixture and 2% of the granulated additive was used in relation to the aggregates. The percentage of voids (% H), the mineral aggregate voids (% V.A.M) and their Marshall properties were determined for the SMA mixtures. Empirical tests were also carried out to measure the runoff of the mixture (AASHTO T-305 standard) and the absorption of the asphalt binder (4.0 g of granulated additive was used with 40 g of binder).

Results

% binder: 6.5% (Complies with M.C Vol. 5)
% H: 2.1% (Complies with M.C Vol. 5)
% V.A.M: 17.1 (Complies with M.C Vol. 5)
Marshall Stability: 7186 N (Additional information)
Marshall Creep: 11.7 mm (Additional Information)
Runoff of mixture with 0.2% Additive, 6.5% binder: There was no runoff.
Absorption 4.0 gr granulated additive, 40 gr Binder: 60% absorption.

From the results obtained, the following can be highlighted:

The incorporation of the granular additive allows the design of SMA-type mixtures, characterized by having high contents of asphalt binder, complying with all the parameters required for its design. In addition, it is possible to observe in the results that the granulated additive has a high absorption capacity of the asphalt binder, either in the mixture or incorporated directly on the asphalt binder. The latter was evaluated after adding 40 g of asphalt binder together with 4.0 g of granulated additive, achieving an absorption of almost 60% of the binder at a temperature of 159° C.

The invention claimed is:

1. A granulated additive based on textile fibers and rubber powder from end-of-life tire (ELT) and asphalt binder, comprising
   a. 20 to 30% textile fiber, composed of polyamide or polyester fibers from end-of-life tire (ELT);
   b. 20 to 50% asphalt binder, wherein the asphalt binder is a residual asphalt binder derived from an asphalt emulsion;
   c. 25 to 45% rubber powder from end-of-life tires (ELT) having a particle size less than 2 mm;
   d. 3 to 10% rubber powder from end-of-life tires (ELT) having a particle size less than 0.18 mm,
   wherein the textile fiber and asphalt binder are wrapped in the rubber powder forming granules and avoiding adherence between the granules of the granulated additive.

2. A method for obtaining a granulated additive based on textile fibers and powder from end-of-life tires (ELT) and asphalt binder according to claim 1, comprising the following steps:
   i. adding to synthetic fibers from ELT, that are at a temperature of 10 to 30° C., an asphalt emulsion diluted in water which is in a temperature range between 5° C. to 70° C. to obtain a diluted emulsion;
   ii. constantly mixing the synthetic fibers from ELT with the diluted emulsion in step (i);
   iii. squeezing an emulsion-saturated fibers after step (ii) is completed;
   iv. step (ii) and (iii) are repeated until the synthetic fibers are coated with emulsion;
   v. drying the product obtained in step (iv);
   vi. extruding and/or kneading the asphalt-coated fibrous dry product resulting from step (v), in order to densify it and give it a predetermined form;
   vii. cutting predetermined shapes obtained in step (vi) comprised by fibrous material with rubber powder from ELT and asphalt, being sized, obtaining the granulated additive in the form of granules;
   viii. mixing the fibrous granules of step (vii), with rubber powder in a proportion by weight between 3 to 10%, to avoid adherence between the granules, obtaining the granulated additive;
   ix. storing the granulated additive from step (viii) for later use.

3. The method for obtaining a granulated additive according to claim 2, wherein the mixture in step (ii) is carried out:
   a. by homogenizing the synthetic fibers with diluted emulsion, at a constant speed between 10 and 200 rpm with intervals of rest.

4. The method for obtaining a granulated additive according to claim 2, wherein step (iii) is carried out by:
   a. manual procedure where the saturated fibers with emulsion are spread in a container, kneaded or compressed until the emulsion runs off; or
   b. mechanical procedure: where the saturated fibers with emulsion are spread in a container, compressed with a hydraulic press, mechanical roller or equipment with similar characteristics, until the emulsion runs.

5. The method for obtaining a granulated additive according to claim 2, wherein step (iv) of drying is carried out by:
   a. manual procedure where the product obtained in step (iii) is spread in a container ensuring that its thickness once spread is less than 40 mm, and has an initial density between 0.05 gr/cm$^3$ and 0.20 g/cm$^3$, dry at a temperature between 10° C. and 40° C. for a period of 2 to 10 days until constant mass is obtained; or
   b. mechanical procedure where the product obtained in step (iii), which has a density between 0.5 gr/cm$^3$ and 1 gr/cm$^3$, is deposited in a storage chamber connected to a mechanical process of air injection with regulation of temperature, a continuous air flow is applied to the product, at a temperature between 10° C. and 70° C. until constant mass is achieved.

6. The method for obtaining a granulated additive according to claim 2, wherein the predetermined shape obtained in step (vi) can be cylindrical, square, rhombic or any other shape.

7. A method of manufacturing asphalt mixtures, a construction material used in flexible pavements comprising adding the granulated additive based on textile fibers according to claim 1 to the asphalt mixtures and to the construction material used in flexible pavements.

* * * * *